(12) United States Patent
Li et al.

(10) Patent No.: US 9,384,778 B2
(45) Date of Patent: Jul. 5, 2016

(54) ONLINE ITERATION RESOURCE ALLOCATION FOR LARGE SECTOR FORMAT DRIVE

(71) Applicant: LSI Corporation, San Jose, CA (US)

(72) Inventors: Shu Li, San Jose, CA (US); Fan Zhang, Milpitas, CA (US); Jun Xiao, Fremont, CA (US)

(73) Assignee: Avago Technologies General IP (Singapore) Pte Ltd., Singapore (SG)

( * ) Notice: Subject to any disclaimer, the term of this patent is extended or adjusted under 35 U.S.C. 154(b) by 175 days.

(21) Appl. No.: 14/269,004

(22) Filed: May 2, 2014

(65) Prior Publication Data

US 2015/0255113 A1    Sep. 10, 2015

Related U.S. Application Data

(60) Provisional application No. 61/949,708, filed on Mar. 7, 2014.

(51) Int. Cl.
*G11B 20/10* (2006.01)

(52) U.S. Cl.
CPC *G11B 20/10527* (2013.01); *G11B 2020/10916* (2013.01)

(58) Field of Classification Search
CPC .............. G11B 2020/10916; G11B 20/10527
See application file for complete search history.

(56) References Cited

U.S. PATENT DOCUMENTS

| 8,381,071 | B1 | 2/2013 | Gunnam | |
|---|---|---|---|---|
| 8,468,418 | B2 | 6/2013 | Yang et al. | |
| 2007/0297088 | A1* | 12/2007 | Sun | G11B 5/59627 360/77.04 |
| 2010/0172046 | A1* | 7/2010 | Liu | G11B 20/10009 360/39 |
| 2011/0167246 | A1* | 7/2011 | Yang | H03M 13/1105 712/233 |
| 2013/0222939 | A1* | 8/2013 | Reddy | G11B 5/09 360/48 |
| 2013/0275986 | A1* | 10/2013 | Yen | G06F 3/061 718/103 |
| 2014/0026004 | A1* | 1/2014 | Jin | G11B 20/18 714/718 |

* cited by examiner

*Primary Examiner* — Edward Dudek, Jr.

(57) ABSTRACT

Systems and methods for resource allocation for a large sector format processing may include, but are not limited to, operations for: determining non-convergence of a magnetic disc sub-sector of a first magnetic disc sector within a processing time frame allocated to the magnetic disc sub-sector; determining a convergence of a second magnetic disc sector occurring in less time than a processing time frame allocated to the second magnetic disc sector; and processing the magnetic disc sub-sector during a portion of the processing time frame allocated to the second magnetic disc sector remaining after processing of the second magnetic disc sector.

20 Claims, 10 Drawing Sheets

FIG. 10 ly, the read head 105 may include one or more trans-
ONLINE ITERATION RESOURCE ALLOCATION FOR LARGE SECTOR FORMAT DRIVE

PRIORITY

The present application claims priority under 35 U.S.C. §119(e) to U.S. Provisional Patent Application Ser. No. 61/949,728, entitled ITERATIVE RESOURCE ALLOCATION FOR LARGE SECTOR FORMAT DRIVES, By Shu Li, et al., filed Mar. 7, 2014, which is currently co-pending, or is an application of which currently co-pending application(s) are entitled to the benefit of the filing date. The above-referenced provisional patent application is hereby incorporated by reference in its entirety.

FIELD OF THE INVENTION

The present invention is directed to systems and methods for resource allocation for a large sector format processing.

SUMMARY

Systems and methods for resource allocation for a large sector format processing may include, but are not limited to, operations for: determining non-convergence of a magnetic disc sub-sector of a first magnetic disc sector within a processing time frame allocated to the magnetic disc sub-sector; determining a convergence of a second magnetic disc sector occurring in less time than a processing time frame allocated to the second magnetic disc sector; and processing the magnetic disc sub-sector during a portion of the processing time frame allocated to the second magnetic disc sector remaining after processing of the second magnetic disc sector.

BRIEF DESCRIPTION OF FIGURES

The numerous advantages of the disclosure may be better understood by those skilled in the art by referencing the accompanying figures in which.

DETAILED DESCRIPTION

Figure 1:
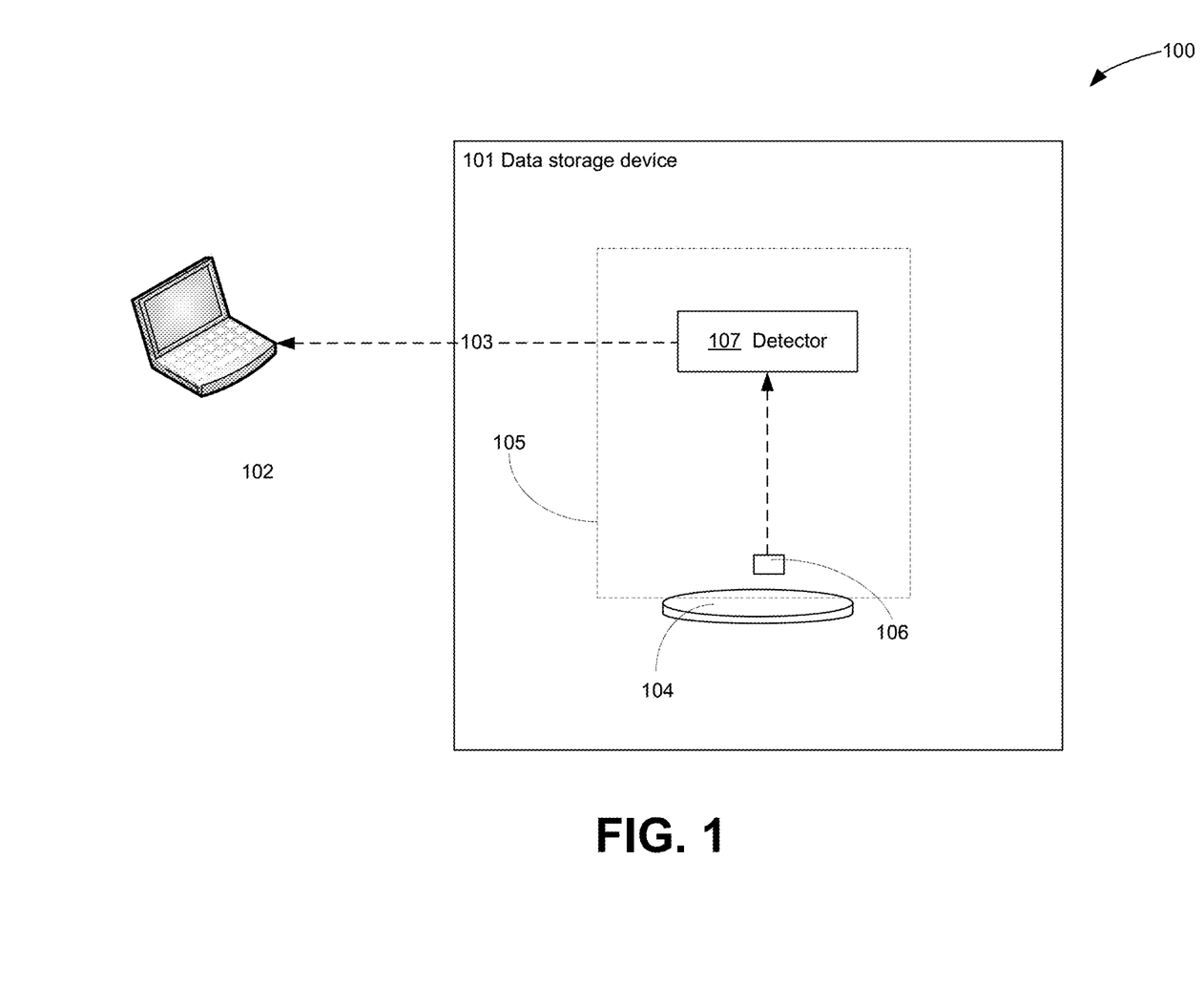
FIG. 1 illustrates a data storage system.

Referring to FIG. 1, a data storage system 100 is shown. The data storage system 100 may include a data storage device 101 operably coupled to a host device 102 (e.g. a personal computing device, a RAID controller, mobile communications device, and the like). The host device 102 may transceive read/write signals via a signal path 103 interconnecting the host device 102 and the data storage device 101.

The data storage device 101 may be a magnetic recording storage device, (e.g. a hard drive, a component drive of a redundant array of independent discs (RAID), or any other magnetic recording medium) including a magnetically recordable disc 104 (e.g. a magnetic disc) readable by a read head 105. The read head 105 may include one or more transducers 106 and a detector 107 configured to translate decode recorded data stored on the disc 104 into the signal path 103 for transmission to the host device 102.

Figure 2:
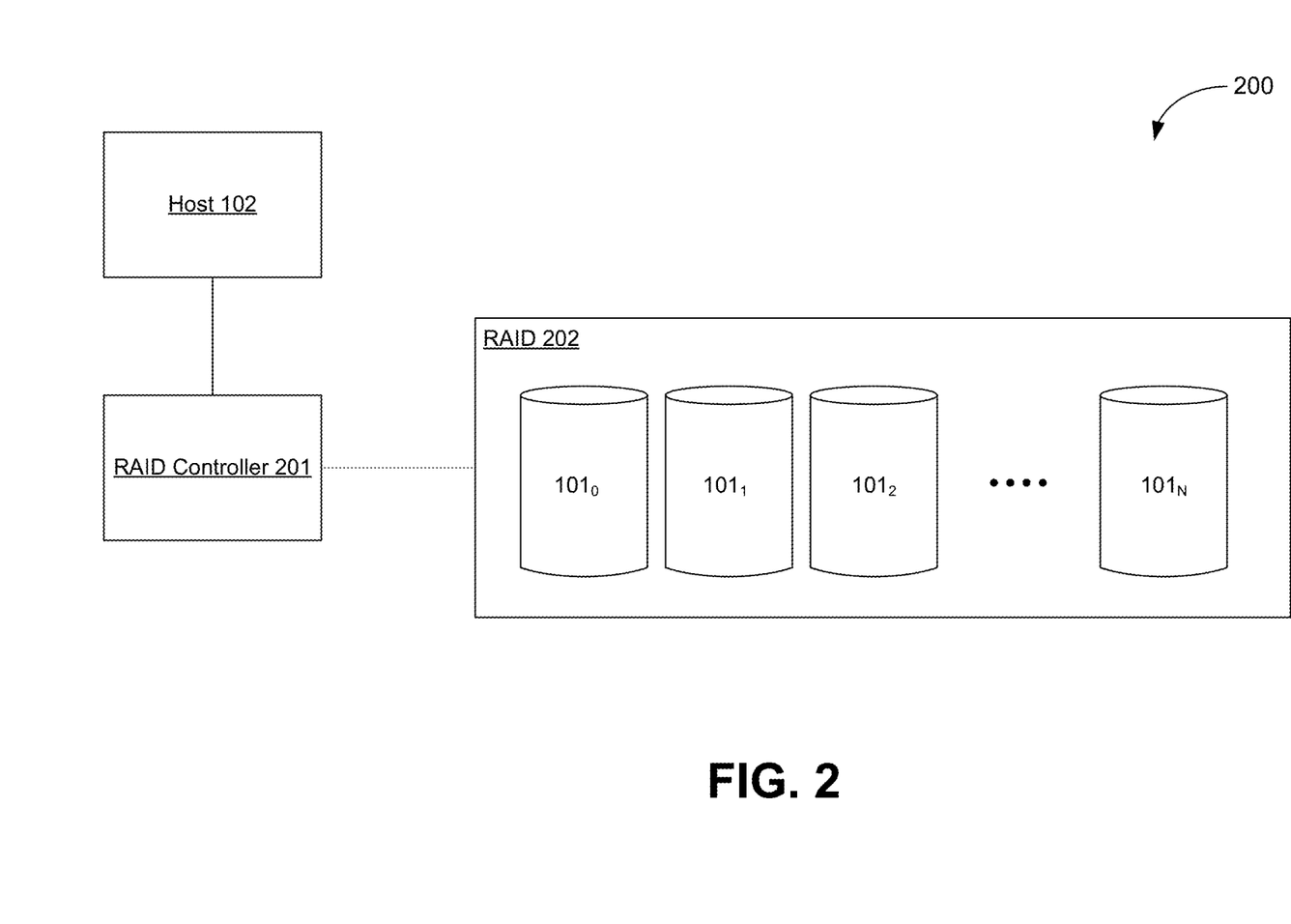
FIG. 2 illustrates a RAID storage system.

In a specific embodiment, as shown in FIG. 2, a RAID system 200 comprising the host device 102, a RAID controller 202, and a RAID 203 is shown. The RAID 203 may include N storage devices including, but not limited to, hard-disc drives, solid-state drives, or a combination thereof, where N is any number greater than one. A data storage device 101 incorporating the disc 104 and the read head 105 including the transducers 106 may be incorporated as a component storage device in the RAID 203. The RAID controller 202 may include volume management circuitry/software whereby the RAID controller 202 can process read/write requests of the host device 102 accessing various logical volumes configured on the RAID 203.

Figure 3:
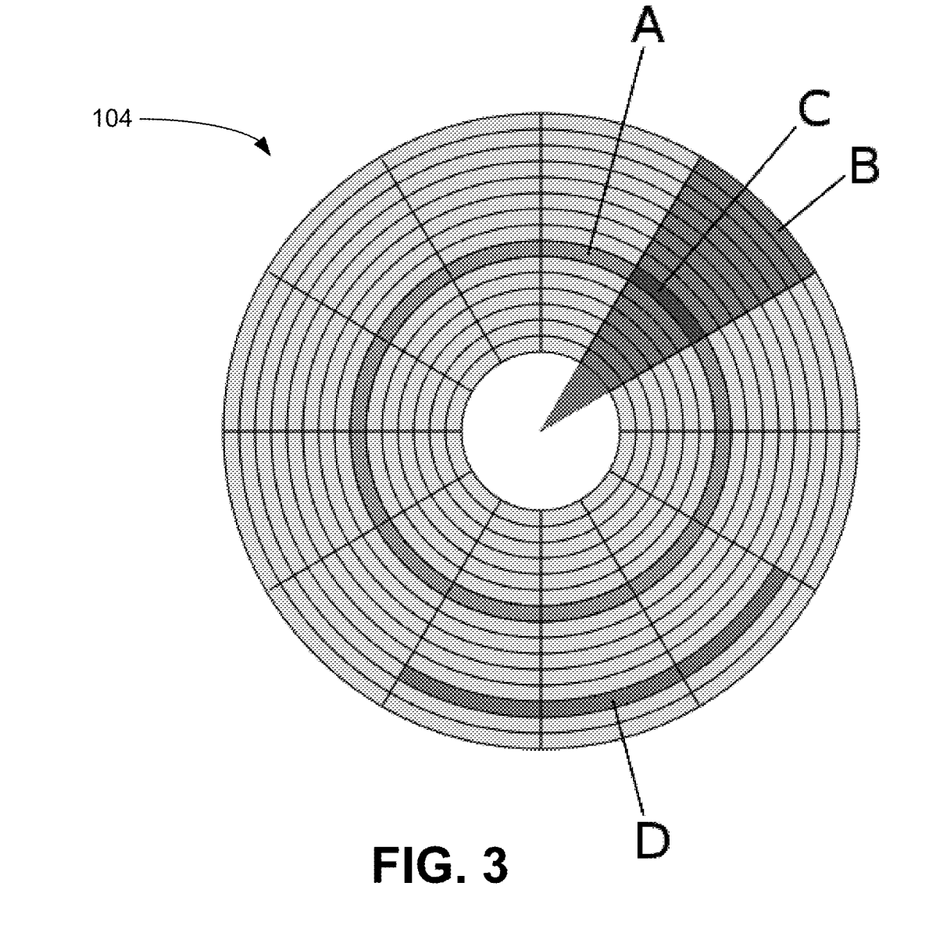
FIG. 3 illustrates a drive disk segmentation diagram.

As shown in FIG. 3, in disc 104, a disc drive track A is a circular path on the disc 104 on which information is magnetically recorded and from which recorded information is read. A disc sector B is a portion of the disc 104 between the center of the disc 104 and an edge of the disc 104 defined on each side by a radii of the disc 104. A track sector C (hereinafter a "sector") is a subdivision of the track A that falls within a given sector B. At the drive or operating system level, two or more sectors C may be grouped to form a cluster D. Each sector C may include one or more sub-sectors. A subsector may be a portion of a sector C readable by the transducers 106 of the read head 105 at any one time.

Each sector C may store a fixed amount of user-accessible data, traditionally 512 bytes for hard drives and 2048 bytes for CD-ROMs and DVD-ROMs. Newer hard drives may use 4096-byte (4 KB) sectors, known as the Advanced Format. Such drives are referred to herein as large sector format drives.

When employing large sector format drives, the system-level characteristics may be different than with normal 512B drive format. A large sector format drive may provide room to improve top-level control especially for backend processing of sub-sectors. Such improvements may include reducing sector failure rate, re-utilize existing resources and constraining area usage and power increases.

Techniques for accomplishing such improvements may include allocating the available processing resources to sub-sectors efficiently. For example, processing resources may be transferred between sectors based on natural gaps in a sector or the early termination of mild sub-sectors. Available resource prediction may be applied to estimate the system costs associated with such transfers to enhance efficiency.

Further, the qualities of a given sub-sector (e.g. a mean square error metric, $L^p$ norm, and the like), may be estimated. An available resources prediction (i.e. a correction strength) as compared to the sub-sector quality (i.e., a number of decoder iterations required to obtain convergence where all parity check bits are zero and a cyclic redundancy check is passed) may form a basis for efficient arrangement by matching both with the flexibly adjusted processing sequences.

Large sector format may maintain the same read throughput as normal format. Large sector format using distributed sectors does not start low-density parity check (LDPC) decoding until a final piece of an LDPC protected sub-sector is received.

Due to media defects, some track sectors may be marked out. To account for such defects, the physical size of the large sector may change from N kBytes to N+M kBytes where M is the size of additional track sector portions added to account for the defective track sectors. In a case of back-to-back defective track sectors, LDPC iterative decoding may not guarantee all LDPC protected sub-sectors will run to a maximum number of turbo code iterations. In other words, processing of some sub-sectors may be terminated early without convergence. Un-converged sub-sectors may be retained until the end of a track.

During track switching, the un-converged sub-sectors can be reprocessed. However, due to the limitation of the buffer size to hold the un-converged sub-sectors, only a limited number of sub-sectors can be retained and reprocessed. Large sector formatted drives may not start back-end processing (e.g. detector, decoder, and interleaver/deinterleaver operations) until all front-end sub-sector processing (e.g. loop detection, sector stitching, media defect detection, and the like) completes. Thus, sub-sector quality can be evaluated and sorted to enable processing in a suitable order. This quality evaluation and sorting may be referred to as backend enhanced metric sorting for large sector backend.

As such, inter-allocation of processing of sub-sectors of a single large sector may be flexibly adjusted online to provide extended processing of non-converging subsectors. Sub-sector reprocessing may be based on the time slot prediction and local retention of the problem sub-sectors.

Such reprocessing of un-converged sub-sectors may occur before reaching the end of given track. For example, in the middle of reading a given track, un-converged sub-sectors from a current sub-sector or previously may be loaded back to a retain buffer and reprocessed using available resources. If these subsectors converge, the retain buffer may be released and re-used for any other un-converged sub-sectors in the same track.

Such decoding may be performed as mixed decoding on both extended process (EP) sub-sectors and local retained sector reprocess (LRSR) subsectors. Sub-sector replacement in LRSR may exchange retain buffer content with a mild (i.e. more easily converged) sub-sector while recovering a retained sector.

To facilitate such operations, buffers may be dynamically tagged to allow of changing roles between a normal decoding buffer and an LRSR buffer for replacement based LRSR to avoid real buffer copying which may serve to save power and reduce latency.

The above noted features may enable better utilization of empty time slots providing performance improvement by processing more un-converged sub-sectors without employing additional buffers.

Figure 4:
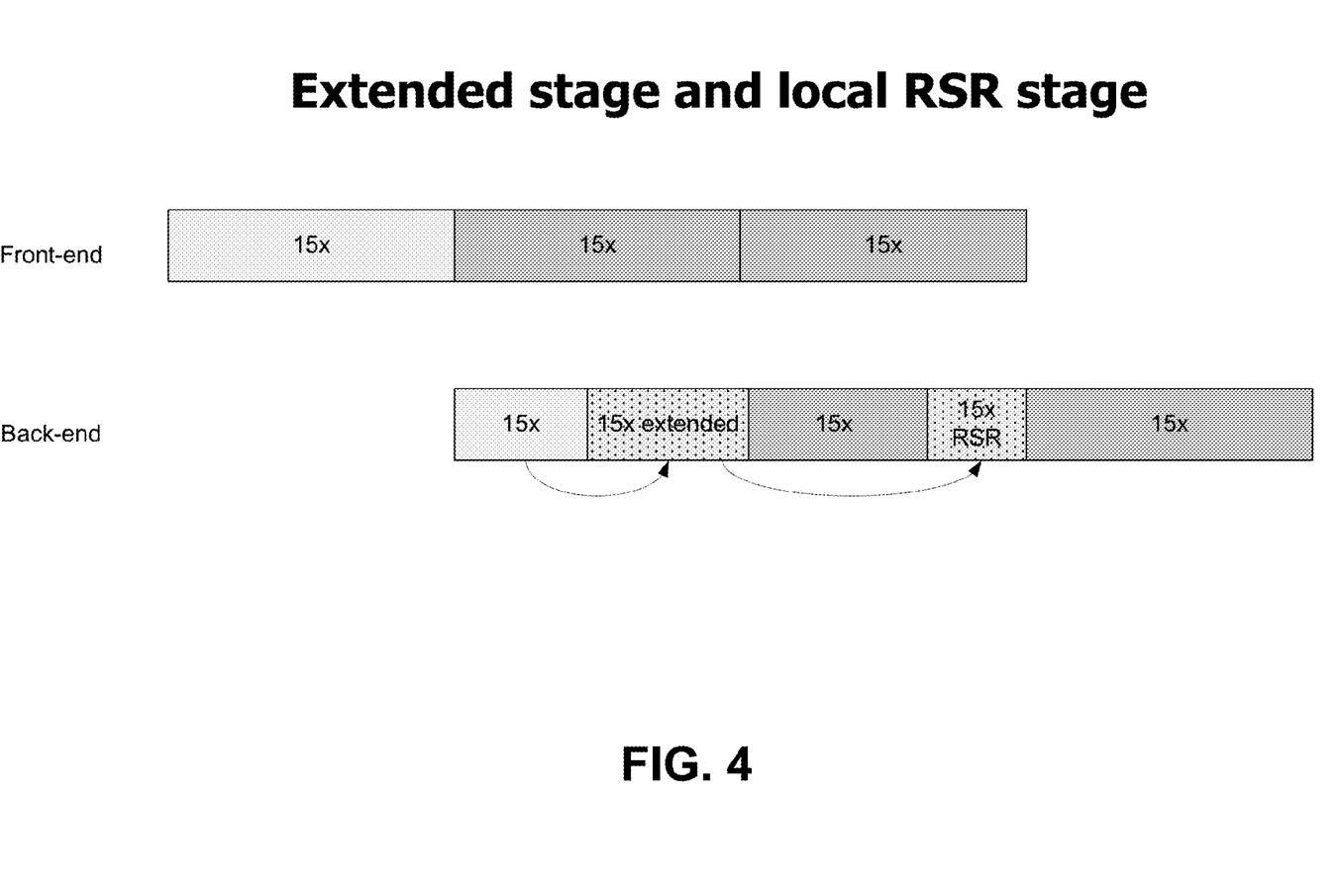
FIGS. 4-9 illustrate drive sector processing pipeline diagrams.

Referring to FIG. 4, a depiction of an extended stage and a LRSR stage for a large sector is illustrated. Within the signal-to-noise ratio (SNR) region where magnetic drives typically operate, the majority of large sectors converge within a few iterations. Before the next large sector is ready to start back-end processing, the idled backend processing resources can grant extended processing on the minority of sub-sectors that were previously un-converged to in an attempt to obtain convergence.

At the end of the extended processing, any sub-sectors which still have not converged may be retained in a buffer. So long as a vacant time slot is available, these retained sub-sectors may be loaded back and reprocessed. For example, when SNR is good, there may be only one or two sectors in a track in error at a given time. These sectors may be maintained in the Y buffer, and reprocessed after all other sectors are processed. Such a scenario may be common at the lower portion of the fast-drop portion of an SFR curve where many subsectors converge in just few turbo iterations, and only few tough sub-sectors needs additional more turbo iterations. An SFR curve may have the SNR value as the x-axis and the log-scaled sector failure rate as the y-axis. LDPC codes may have a sharp drop of the curve as SNR goes large.

Figure 5:
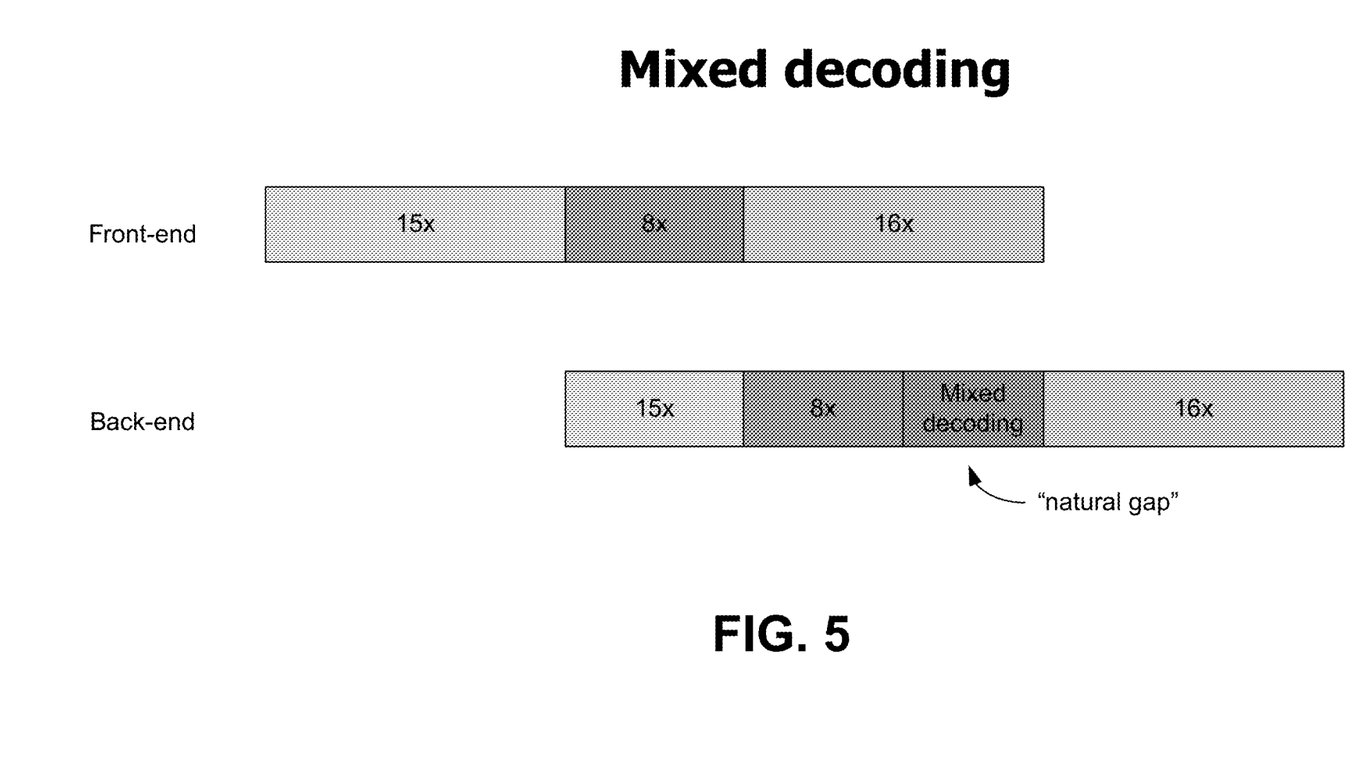

Often, large sectors have varying numbers of sub-sectors. As such, as illustrated in FIG. 5, a "natural gap" may be formed on the fly. Such a natural gap may exist in all SNR regions without a requirement on how fast sub-sectors are required to converge. In other words, it does not rely on the time available from the early convergence of other sub-sectors in that it is not a time sharing scheme.

Each large sector may be provided its own window for backend processing. To avoid buffer overflow and a bursting sector failure, processing for the entirety of large sector needs to complete (i.e. converge or be passed on for reprocessing) within its designated window. Such natural gaps may be use to perform mixed decoding of either LRSR for a prior sub-sector or perform EP of a current un-converged sub-sector.

Extended process decoding may occur accumulatively on top of prior turbo iterations for a given sub-sector. Such extended processing may continue while the current large sector is subject to processing. Extended processing has the advantage of using a decoding outcome of a prior iteration for a current sub-sector. As such, it given higher priority over LRSR operations when a natural gap is available.

Figure 6:
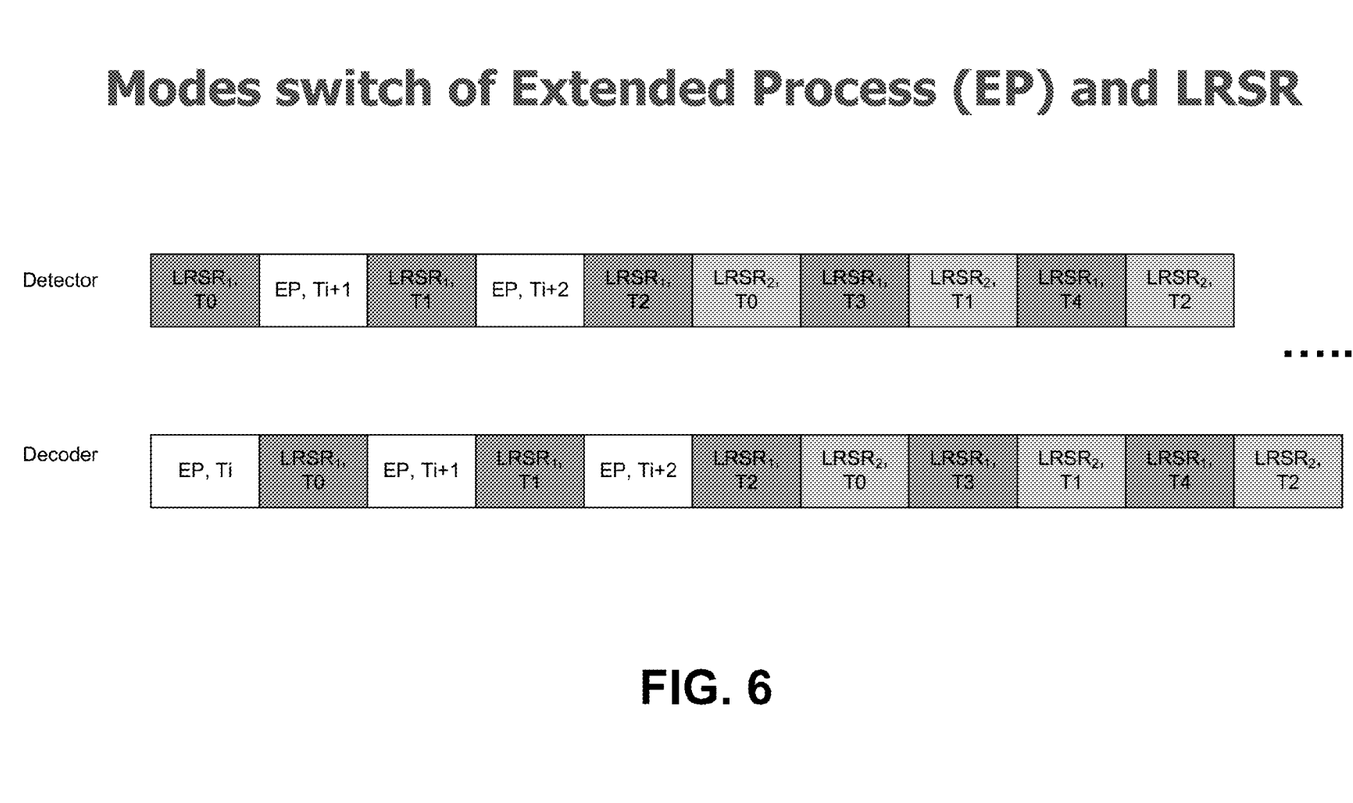

As shown in FIG. 6, back-end processing may process two sub-sectors in parallel. This may occur through detector/decoder rotation between an LRSR subsector (e.g. $LRSR_1$) and an EP sub-sector. After processing of an EP sub-sector is completed, a second LRSR sub-sector (e.g. $LRSR_2$) may be loaded and reprocessed. Such a configuration avoids the case where only a single sub-sector is being processed by the back end when multiple EP and or LRSR sub-sectors are enqueued.

Figure 7:
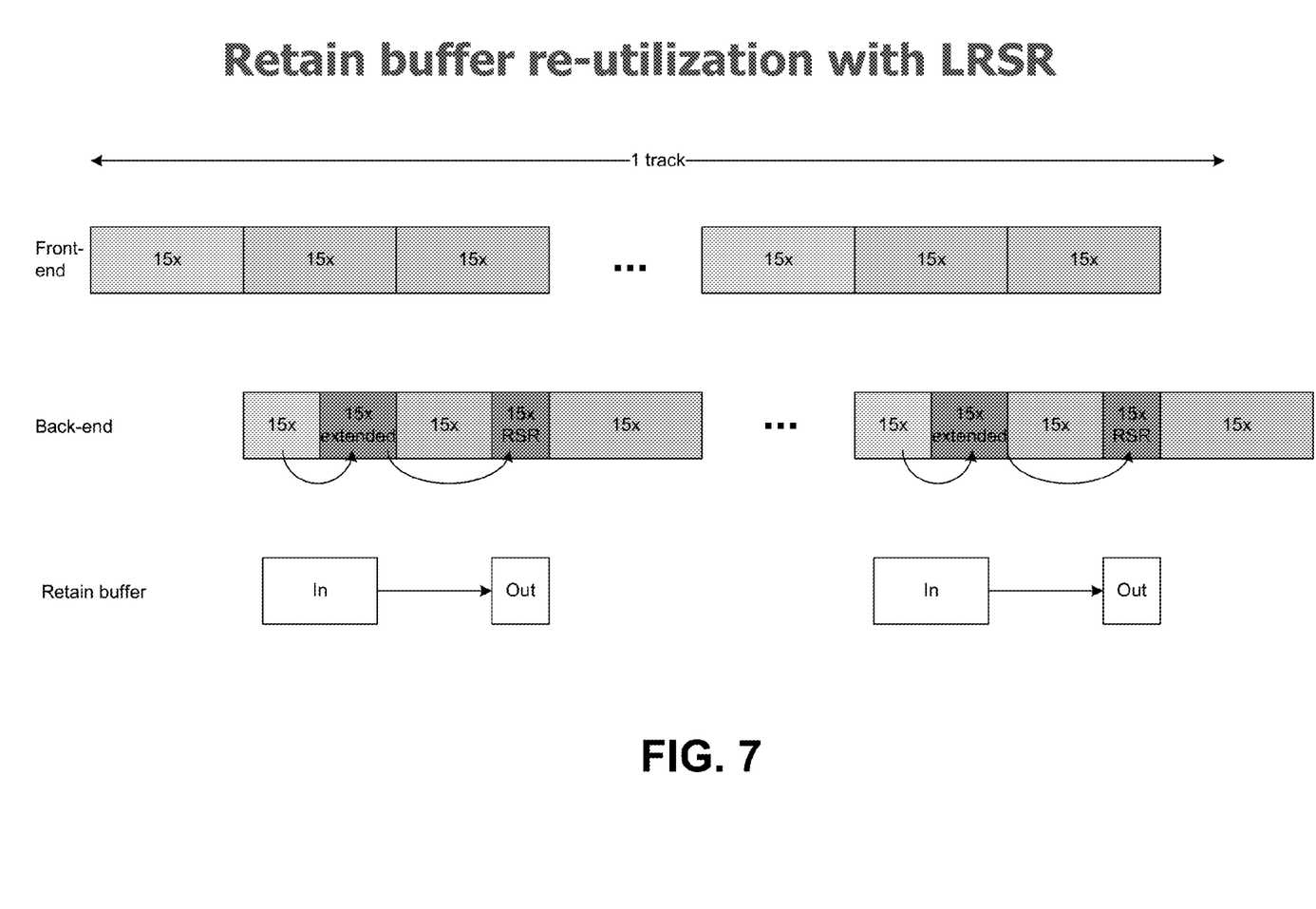

As shown in FIG. 7, a retain buffer may hold an un-converged subsector until there is a natural gap or time sharing slot available. The LRSR may release the retain buffer as soon as the retained sub-sector converges during the processing of a track. The re-use of the retain buffer allows for the reprocessing of more un-converged sub-sectors without increasing buffer size. Any remaining un-converged sub-sectors may still be retained in the buffer to allow further processing during track switching. As such, the conventional RSR operations remain available.

Figure 8:
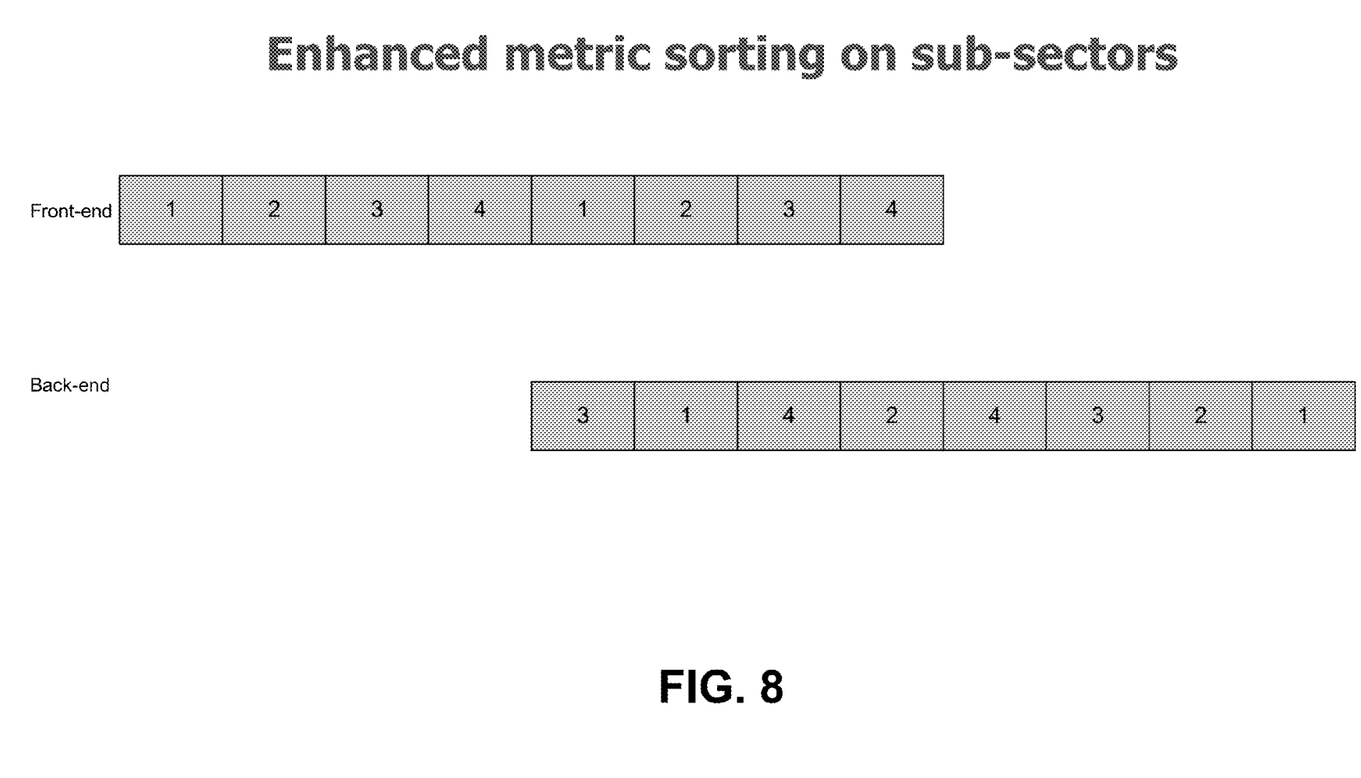

Further, as shown in FIG. 8, the back-end processing may decouple from the front-end processing. Prior to commencing back-end processing, all sub-sectors in a given large sector may be evaluated and sorted according to one or more quality metrics (e.g. a mean square error metric, $L^p$ norm, and the like). Based on this sorting, the sub-sectors may be selectively sequenced for back-end processing with sub-sectors having quality metrics indicative of easier convergence given higher priority. Such prioritization avoids sub-sector failure bursts where difficult sub-sectors are blocking milder sub-sectors. Further, this prioritization effectively places difficult sub-sectors toward the end of the queue to allow for effective EP should it be triggered for a current sub-sector.

Figure 9:
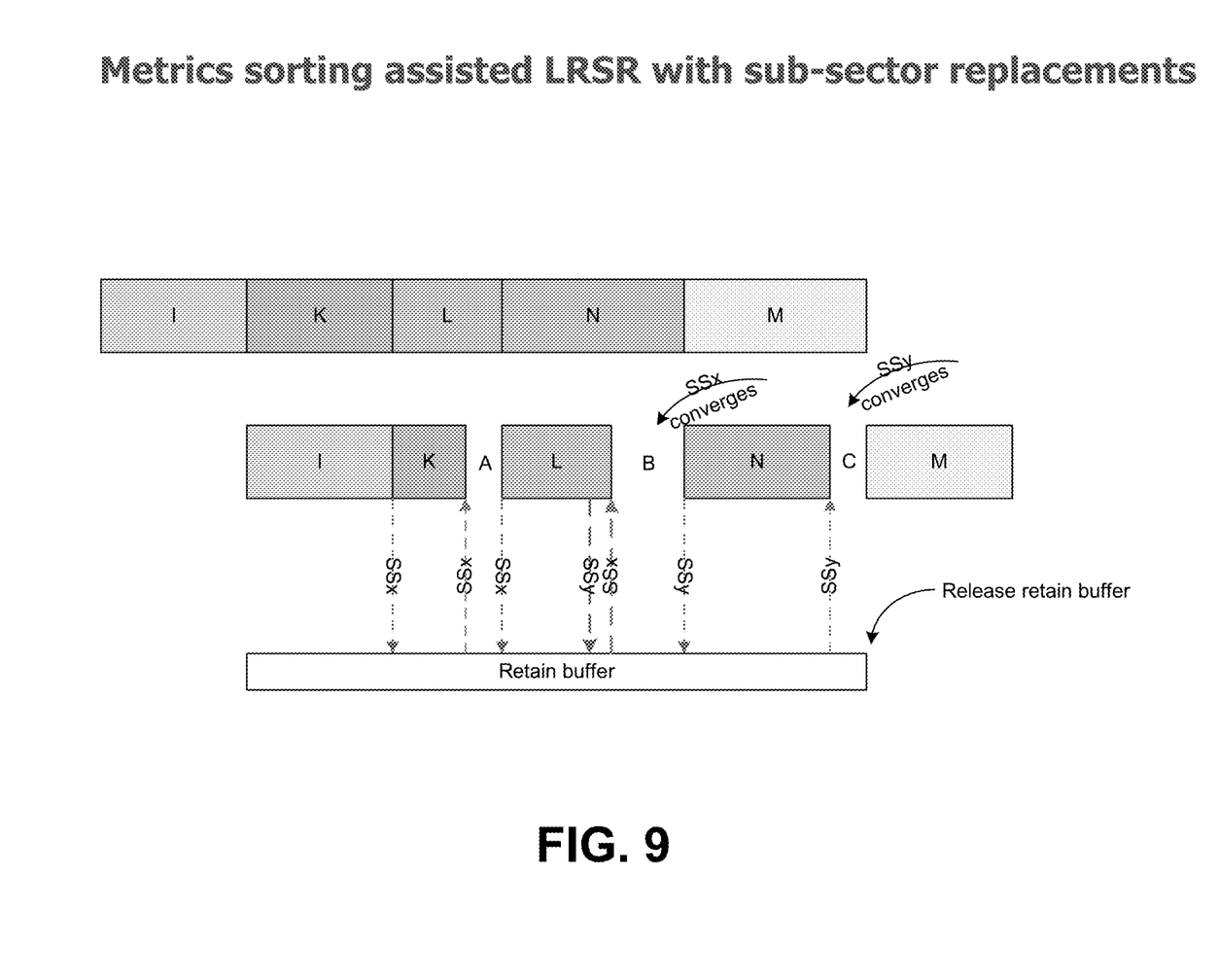

As shown in FIG. 9, a difficult sub-sector may be replaced in the retain buffer with a more mild sub-sector. The difficult sub-sector is then reprocessed over a longer time while the mild sub-sector may be processed in a shorter slot. In large sector mode, a hard drive controller may notify a read channel of the size of adjacent large sectors. Thus potential slot length may be predictable after combining with quality metric sorting.

For an available short slot length, it may be better to process a known easy sub-sector rather than a retained sub-sector know to need enhanced processing. The processing scheme presented herein provides for enhancing the success rate of LRSR by using free slots during reading.

As a specific example, as shown in FIG. 9, Large sector I may include a tough sub-sector (e.g., SSx) which does not converge in normal decoding and/or extended process (EP). As such, SSx may be pushed into the retain buffer at the end of I's backend process. A slot A may be created after large sector K's sub-sectors all converge. SSx may be loaded and reprocessed in slot A. It may be the case that Slot A is not long enough for SSx to converge, so SSx may be pushed back to the retain buffer again. At large sector L's backend process, the sub-sector quality analysis shows all of L's sub-sectors may have sufficient quality. According to next large sector N's length and large sector L's metric sorting, slot B's length is estimated and the possibility of obtaining convergence of SSx is evaluated. The sub-sector of large sector L estimated to be the easiest to converge (e.g. SSy) may be determined as a candidate for replacement with SSx. SSx may be loaded, and SSy may be pushed into retain buffer. SSx may be run as large sector L's last sub-sector to allow for extend turbo iterations as allowed by slot B. SSx may converge during slot B and be sent out.

Large sector may provide slot C that is short. SSy may be loaded and quickly decoded and sent out and the retain buffer may be released. If Ssy does not converge this time, it may be returned to the retain buffer and reprocessed at the next available slot. Such loading from/pushing back to a specific retain buffer may consume power, increases latency and may necessitate an intermediate third cache.

Figure 10:
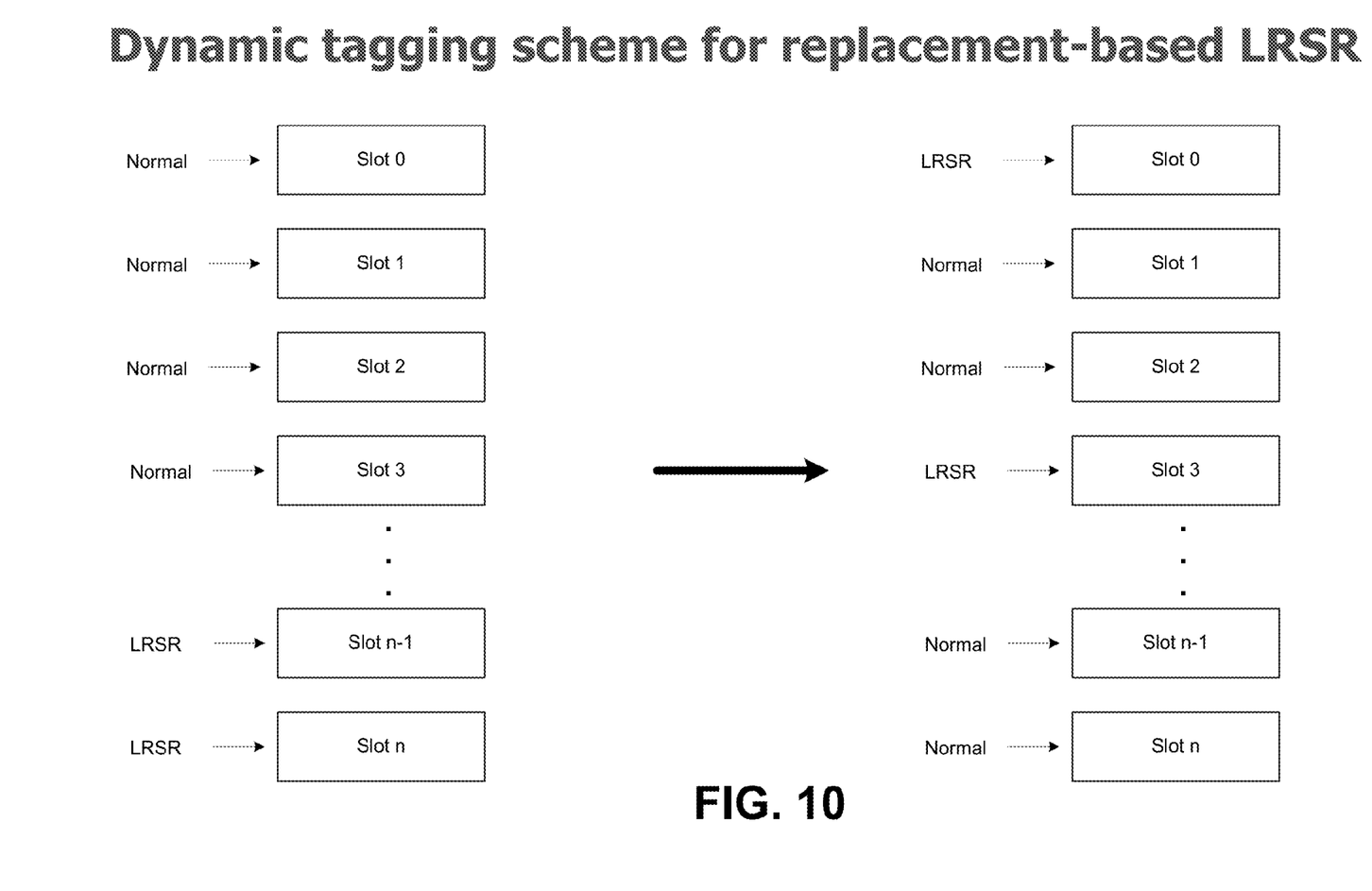
FIG. 10 illustrates a tagging scheme for replacement-based LRSR.

As shown in FIG. 10, dynamic tagging may employ a finite-state machine to assign pointers for all buffers to designate normal process buffers and retain buffers. When a buffer is released, it may be directly overwritten to take in new data. During a replacement operation as described with respect to FIG. 9, rather than transferring data between buffers, a tag associated with each respective buffer may be modified. The tag may also provide the sequence for processing based on the enhanced metric sorting.

For example, normal and LRSR buffer in fact form a group of sharing buffers. In the case of no failed sub-sectors, LRSR buffers may also used for normal decoding or decision buffering.

It is believed that the present disclosures and many of their attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disc, a hard disc drive, a Compact Disc (CD), a Digital Video Disc (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

What is claimed is:

1. A computing-device implemented method comprising:
    determining non-convergence of a magnetic disc sub-sector of a first magnetic disc sector within a processing time frame allocated to the magnetic disc sub-sector;
    determining a convergence of a second magnetic disc sector occurring in less time than a processing time frame allocated to the second magnetic disc sector;
    processing the magnetic disc sub-sector during a portion of the processing time frame allocated to the second magnetic disc sector remaining after processing of the second magnetic disc sector.

2. The computing-device implemented method of claim 1, wherein the first magnetic disc sector and the second magnetic disc sector are large format magnetic disc sectors.

3. The computing-device implemented method of claim 1, wherein the first magnetic disc sector and the second magnetic disc sector are disc sectors of at least one storage device of a redundant array of independent discs (RAID).

4. The computing-device implemented method of claim 1, wherein the processing the magnetic disc sub-sector during a portion of the processing time frame allocated to the second magnetic disc sector remaining after processing of the second magnetic disc sector includes:
  processing the magnetic disc sub-sector during a portion of the processing time frame allocated to the second magnetic disc sector directly follows a processing time frame allocated to the first magnetic disc sector.

5. The computing-device implemented method of claim 1, wherein the processing the magnetic disc sub-sector during a portion of the processing time frame allocated to the second magnetic disc sector remaining after processing of the second magnetic disc sector includes:
  storing data of the magnetic disc sub-sector to a buffer;
  re-loading the data of the magnetic disc sub-sector from the buffer; and
  processing the data of the magnetic disc sub-sector during a portion of the processing time frame allocated to the second magnetic disc sector remaining after processing of the second magnetic disc sector that does not directly follow a processing time frame allocated to the first magnetic disc sector.

6. The computing-device implemented method of claim 5, wherein the re-loading the data of the magnetic disc sub-sector from the buffer includes:
  swapping the data of the magnetic disc sub-sector stored in the buffer with data of at least one magnetic disc sub-sector of at least one of the second sector or another sector present in a back-end processing pipeline and having an estimated convergence efficiency greater than the sub-sector stored in the buffer.

7. The computing-device implemented method of claim 1, further comprising:
  sorting two or more sub-sectors of the first magnetic disk sector according to an estimated convergence efficiency; and
  processing the two or more sub-sectors according to their estimated convergence efficiencies.

8. A system comprising:
  at least one computing device; and
  one or more instructions which, when implemented in the at least one computing device, configure the at least one computing device for at least:
    determining non-convergence of a magnetic disc sub-sector of a first magnetic disc sector within a processing time frame allocated to the magnetic disc sub-sector;
    determining a convergence of a second magnetic disc sector occurring in less time than a processing time frame allocated to the second magnetic disc sector; and
    processing the magnetic disc sub-sector during a portion of the processing time frame allocated to the second magnetic disc sector remaining after processing of the second magnetic disc sector.

9. The system of claim 8, wherein the first magnetic disc sector and the second magnetic disc sector are large format magnetic disc sectors.

10. The system of claim 8, wherein the first magnetic disc sector and the second magnetic disc sector are disc sectors of at least one storage device of a redundant array of independent discs (RAID).

11. The system of claim 8, wherein the processing the magnetic disc sub-sector during a portion of the processing time frame allocated to the second magnetic disc sector remaining after processing of the second magnetic disc sector includes:
  processing the magnetic disc sub-sector during a portion of the processing time frame allocated to the second magnetic disc sector directly follows a processing time frame allocated to the first magnetic disc sector.

12. The system of claim 8, wherein the processing the magnetic disc sub-sector during a portion of the processing time frame allocated to the second magnetic disc sector remaining after processing of the second magnetic disc sector includes:
  storing data of the magnetic disc sub-sector to a buffer;
  re-loading the data of the magnetic disc sub-sector from the buffer; and
  processing the data of the magnetic disc sub-sector during a portion of the processing time frame allocated to the second magnetic disc sector remaining after processing of the second magnetic disc sector that does not directly follow a processing time frame allocated to the first magnetic disc sector.

13. The system of claim 5, wherein the re-loading the data of the magnetic disc sub-sector from the buffer includes:
  swapping the data of the magnetic disc sub-sector stored in the buffer with data of at least one magnetic disc sub-sector of at least one of the second sector or another sector present in a back-end processing pipeline and having an estimated convergence efficiency greater than the sub-sector stored in the buffer.

14. The system of claim 8, further comprising instructions which, when implemented in the at least one computing device, configure the at least one computing device for at least:
  sorting two or more sub-sectors of the first magnetic disk sector according to an estimated convergence efficiency; and
  processing the two or more sub-sectors according to their estimated convergence efficiencies.

15. A system comprising:
  circuitry for determining non-convergence of a magnetic disc sub-sector of a first magnetic disc sector within a processing time frame allocated to the magnetic disc sub-sector;
  circuitry for determining a convergence of a second magnetic disc sector occurring in less time than a processing time frame allocated to the second magnetic disc sector; and
  circuitry for processing the magnetic disc sub-sector during a portion of the processing time frame allocated to the second magnetic disc sector remaining after processing of the second magnetic disc sector.

16. The system of claim 15, wherein the first magnetic disc sector and the second magnetic disc sector are large format magnetic disc sectors.

17. The system of claim 15, wherein the first magnetic disc sector and the second magnetic disc sector are disc sectors of at least one storage device of a redundant array of independent discs (RAID).

18. The system of claim 15, wherein the circuitry for processing the magnetic disc sub-sector during a portion of the processing time frame allocated to the second magnetic disc sector remaining after processing of the second magnetic disc sector includes:
    circuitry for processing the magnetic disc sub-sector during a portion of the processing time frame allocated to the second magnetic disc sector directly follows a processing time frame allocated to the first magnetic disc sector.

19. The system of claim 15, wherein the circuitry for processing the magnetic disc sub-sector during a portion of the processing time frame allocated to the second magnetic disc sector remaining after processing of the second magnetic disc sector includes:
    circuitry for storing data of the magnetic disc sub-sector to a buffer;
    circuitry for re-loading the data of the magnetic disc sub-sector from the buffer; and
    circuitry for processing the data of the magnetic disc sub-sector during a portion of the processing time frame allocated to the second magnetic disc sector remaining after processing of the second magnetic disc sector that does not directly follow a processing time frame allocated to the first magnetic disc sector.

20. The system of claim 15, further comprising instructions which, when implemented in the at least one computing device, configure the at least one computing device for at least:
    sorting two or more sub-sectors of the first magnetic disk sector according to an estimated convergence efficiency; and
    processing the two or more sub-sectors according to their estimated convergence efficiencies.

* * * * *